United States Patent
Yamaguchi

(10) Patent No.: US 9,228,476 B2
(45) Date of Patent: Jan. 5, 2016

(54) INTAKE AND EXHAUST DEVICE OF MULTI-CYLINDER ENGINE

(75) Inventor: Keisuke Yamaguchi, Kure (JP)

(73) Assignee: Mazda Motor Corporation, Hiroshima (JP)

( * ) Notice: Subject to any disclaimer, the term of this patent is extended or adjusted under 35 U.S.C. 154(b) by 420 days.

(21) Appl. No.: 13/540,994

(22) Filed: Jul. 3, 2012

(65) Prior Publication Data

US 2013/0074478 A1    Mar. 28, 2013

(30) Foreign Application Priority Data

Sep. 28, 2011   (JP) ................. 2011-212243

(51) Int. Cl.
| | |
|---|---|
| *F01N 3/00* | (2006.01) |
| *F01N 3/10* | (2006.01) |
| *F01N 13/08* | (2010.01) |
| *F01N 13/10* | (2010.01) |
| *F01N 3/28* | (2006.01) |
| *F01L 1/344* | (2006.01) |
| *F02D 13/02* | (2006.01) |

(52) U.S. Cl.
CPC ............. *F01N 13/08* (2013.01); *F01L 1/344* (2013.01); *F01N 3/2892* (2013.01); *F01N 13/10* (2013.01); *F01N 2560/025* (2013.01); *F02D 13/0261* (2013.01)

(58) Field of Classification Search
CPC ....... F01N 13/08; F01N 3/2892; F02D 13/02; F02D 13/0261; F01L 1/344
USPC .......................................................... 60/313
See application file for complete search history.

(56) References Cited

U.S. PATENT DOCUMENTS

| | | | |
|---|---|---|---|
| 5,203,311 A | 4/1993 | Hitomi et al. | |
| 5,740,671 A * | 4/1998 | Jones | ............... 60/323 |

(Continued)

FOREIGN PATENT DOCUMENTS

| | | |
|---|---|---|
| CN | 1349588 A | 5/2002 |
| CN | 201982161 U | 9/2011 |

(Continued)

OTHER PUBLICATIONS

PTO 12-2296 (English translation of JP 01-076520 U).*

(Continued)

*Primary Examiner* — Audrey K Bradley
*Assistant Examiner* — Jason Sheppard
(74) *Attorney, Agent, or Firm* — Alleman Hall McCoy Russell & Tuttle LLP

(57) ABSTRACT

A device of an engine having a plurality of cylinders includes: exhaust passages each connected with either a single cylinder or two or more cylinders having non-adjacent exhaust order; a manifold section connected with each downstream end of the exhaust passages; a catalyst device downstream of the manifold section; and a valve driver. Within a low-speed and high-load engine operating range, the valve driver drives intake and exhaust valves of each cylinder such that, for a particular cylinder, a period of positive valve overlap overlaps an exhaust valve opening time of another cylinder adjacent in the exhaust order. The manifold section includes a part that reduces in diameter downstream from the upstream end of the manifold section, and a straight part with a substantially fixed flow area extending upstream from the downstream end of the manifold section. In this way, negative pressure may be generated due to an ejector effect.

7 Claims, 12 Drawing Sheets

(56) References Cited

U.S. PATENT DOCUMENTS

| | | | |
|---|---|---|---|
| 5,758,497 A * | 6/1998 | Frederiksen et al. | 60/299 |
| 6,082,103 A | 7/2000 | Sugiura et al. | |
| 6,668,548 B1 | 12/2003 | Asanuma et al. | |
| 2007/0095056 A1 | 5/2007 | Richter | |
| 2009/0094978 A1 | 4/2009 | Yamagata et al. | |
| 2010/0000201 A1 | 1/2010 | Hoshi | |
| 2010/0192557 A1 * | 8/2010 | Takahashi et al. | 60/313 |

FOREIGN PATENT DOCUMENTS

| | | | |
|---|---|---|---|
| DE | 10144015 A1 | 3/2003 | |
| GB | 319426 * | 9/1929 | |
| JP | 01-076520 U * | 5/1989 | F02B 27/04 |
| JP | H02157420 A | 6/1990 | |
| JP | H02119922 U | 9/1990 | |
| JP | 2005256785 A | 9/2005 | |
| JP | 2009097335 | 5/2009 | |
| JP | 2009197759 A | 9/2009 | |
| JP | 2010014032 A | 1/2010 | |

OTHER PUBLICATIONS

Translation of Office Action issued by German Patent and Trademark Office in Patent application No. 102012014648.5, Office Action originally issued on Oct. 23, 2014, 9 pages.

* cited by examiner

INTAKE AND EXHAUST DEVICE OF MULTI-CYLINDER ENGINE

BACKGROUND

The present invention relates to an intake and exhaust device of a multi-cylinder engine provided to, for example, an automobile.

Conventionally, an intake and exhaust device has been developed for an engine of, for example, an automobile for the purpose of increasing an engine output.

For example, JP2009-097335A discloses a device including a turbocharger. The device is provided with a plurality of independent exhaust passages that are respectively connected with exhaust ports of cylinders and independent from each other, a manifold section provided upstream of the turbocharger and where the independent passages assemble, and valves that are provided to the manifold section and can change flow areas of the independent passages. The device reduces the flow areas of the independent passages by the valves so that exhaust gas in the cylinder on exhaust stroke flows from a predetermined independent passage to the manifold section at comparatively high speed. Further, the exhaust gas in the other independent passages is sucked downstream thereof by a so called ejector effect caused by a negative pressure produced around the exhaust gas flowing at high speed that affects the other independent passages in the manifold section. In this manner, an amount of gas supplied to the turbocharger is increased to increase the engine output.

While the output of the engine itself is desired to be increased as above, in regard to mass producing, for example, vehicles, it is desired to suppress a performance variation between vehicles due to a manufacturing variation, etc.

The present invention is made in view of the above situations, and provides an intake and exhaust device of a multi-cylinder engine that can suppress a performance variation due to a manufacturing variation, etc.

Means for Solving the Problems

According to one aspect of the invention, an intake and exhaust device of a multi-cylinder engine having a plurality of cylinders each respectively formed with an intake port and an exhaust port and respectively provided with an intake valve for opening and closing the intake port and an exhaust valve for opening and closing the exhaust port is provided. The device includes: independent exhaust passages, each independent exhaust passage connected with either one of a single cylinder or two or more cylinders not adjacent to each other in an exhaust order; a manifold section connected with each downstream end of the independent exhaust passages to merge exhaust gas passed through the independent exhaust passages therein; a catalyst device connected with a downstream end of the manifold section and including a catalyst for purifying the exhaust gas passed through the manifold section, and a catalyst case for accommodating the catalyst; and a valve driver for driving the intake and exhaust valves of each cylinder. Within a low-speed and high-load engine operating range where at least an engine speed is below a predetermined speed and an engine load is above a predetermined load, the valve driver drives the intake and exhaust valves of each cylinder to overlap such that, for a particular cylinder, an opening period of a first intake valve overlaps with an opening period of a first exhaust valve for a predetermined overlap period, and the overlap period of that particular cylinder overlaps a timing where a second exhaust valve of an associated cylinder adjacent in exhaust order to the particular cylinder opens. The independent exhaust passages connected with the cylinders where the exhaust order is adjacent are adjacently connected with the manifold section. The downstream end of each independent exhaust passage is shaped to have a flow area smaller toward a downstream direction so that a negative pressure is generated in the exhaust port connected with one or more adjacent independent exhaust passages by an ejector effect due to the exhaust gas being discharged from the exhaust port of each cylinder to the manifold section through the downstream end of the corresponding independent exhaust passage. The manifold section includes a reduced diameter part extending downstream from an upstream end of the manifold section and having a smaller flow area toward a downstream direction, and a straight tube part extending upstream with a substantially fixed flow area from the downstream end of the manifold section.

According to the device, at least within the low-speed and high-load engine operating range, the fresh air inside the cylinder is increased. Thus, an engine output can be increased and a variation in the engine output increasing effect caused between devices and, further, vehicles installed with the devices can be suppressed.

Specifically, with the device, the flow area of the downstream end of the independent exhaust passage is set smaller in the downstream direction. Therefore, the exhaust gas can flow from the independent exhaust passage into the manifold section at high speed, and thus, an ejector effect can be obtained effectively. Thus, a high negative pressure can be generated in a predetermined exhaust port. Further, within the low-speed and high-load engine operating range, during the overlap period of a predetermined cylinder, the exhaust valve of another cylinder opens. Therefore, within the low-speed and high-load engine operating range, the high negative pressure generated by the exhaust gas discharged from the other cylinder can affect on the cylinder in the overlap period, the scavenging in the overlap period can be facilitated by the negative pressure, and the fresh air inside the cylinder can be increased.

Particularly, with the device, the upstream end part of the manifold section is the reduced diameter part where the flow area is smaller in the downstream direction. Therefore, the exhaust gas flowed from the independent exhaust passage into the manifold section at high speed can flow further downstream at the same speed or at higher speed. Here, the negative pressure generated around the exhaust gas flowing from the manifold section becomes higher as the speed of the exhaust gas becomes higher. Therefore, the negative pressure generated around the exhaust gas flowing downstream from the manifold section and, further, the negative pressure that affects on the exhaust port of the cylinder in the overlap period can be increased, and the scavenging facilitating effect can be improved.

Here, to flow the exhaust gas at high speed in the manifold section, as described above, the flow area of the part extending downstream from the upstream end of the manifold section may be set smaller in the downstream direction. For example, the flow area of the entire manifold section may be gradually reduced toward the downstream direction to increase the speed of the exhaust gas downstream, or the flow area may be reduced toward the downstream direction for a predetermined length from the upstream end of the manifold section and then gradually increased toward the downstream direction to form a so-called diffuser in the downstream part of the manifold section. However, with the configuration where the flow area of the manifold section changes near its downstream end (the flow area is gradually reduced or increased), the speed of the exhaust gas is different depending on the position of the downstream end in the upstream-downstream direction. Thus, there has been a problem that when the length of the manifold section (i.e., the position of the downstream end of the manifold section) varies due to a manufacturing variation, the speed of the exhaust gas at the downstream end of the manifold section and, further, the level of the negative pressure generated due to the exhaust gas may vary.

In this regard, with the device, the downstream end part of the manifold section is the straight tube part extending with a substantially fixed flow area. Therefore, even if the length of the manifold section (i.e., the position of the downstream end of the manifold section) varies in the upstream-downstream direction, the flow area of the downstream end of the manifold section is fixed. Thus, the level of the negative pressure and, further, the engine output increasing effect can be fixed.

The straight tube part may extend with substantially the same flow area as the flow area of the downstream end of the reduced diameter part from the downstream end of the reduced diameter part to the downstream end of the manifold section.

With this configuration, the manifold section is constituted with only the reduced diameter part and the straight tube part. Therefore, the length of the manifold section can be shortened and the device can be reduced in size. Further, distances from the cylinders to the catalyst device can be shortened and, thus, early activation of the catalyst can be achieved by increasing the temperature of the exhaust gas flowing into the catalyst device, and the activation of the catalyst can surely be maintained.

Further, with this configuration, the straight tube part, where the flow speed of the exhaust gas decelerates and the exhaust gas easily spreads evenly in a cross-sectional direction orthogonal to the upstream-downstream direction (i.e., the distribution of the exhaust gas easily becomes even), extends downstream from the downstream end of the reduced diameter part where the flow area becomes minimum, and the catalyst device is connected with the downstream end of the straight tube part. Therefore, the exhaust gas is introduced into the catalyst further evenly and the exhaust gas can be purified efficiently by the catalyst.

The device may further include an oxygen concentration detector including a contact part contacting with the exhaust gas discharged from each cylinder and for detecting an oxygen concentration within the exhaust gas. The contact part may be arranged inside the catalyst case between downstream of the manifold section and upstream of the catalyst.

As described above, according to the above configuration, the exhaust gas can spread in the direction orthogonal to the upstream-downstream direction in the straight tube part provided at the downstream end of the manifold section. Therefore, by arranging the contact part of the oxygen concentration detector right next to the manifold section (i.e., between downstream of the manifold section and upstream of the catalyst), the concentration of the further evenly spread exhaust gas can be detected and the accuracy of detecting the oxygen concentration can be improved.

The device may further include an external cylinder serving as a cylindrical member integrally formed with the catalyst case and extending from an upstream end of the catalyst case to the upstream end of the manifold section to be connected therewith, the manifold section being accommodated inside the external cylinder.

Thus, the rigidity of the part where the manifold section is provided can be improved.

DETAILED DESCRIPTION OF THE EMBODIMENTS

Embodiments of an intake and exhaust device of a multi-cylinder engine according to the invention is described with reference to the appended drawings.

Figure 1:
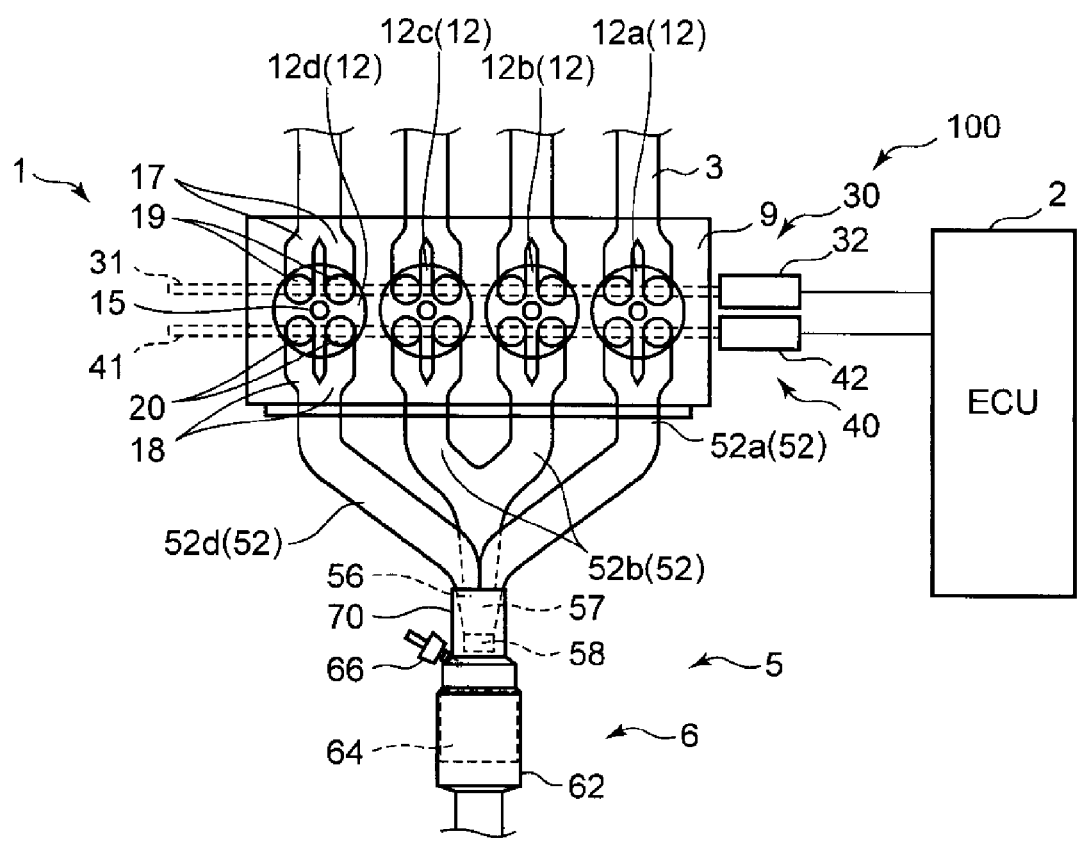
FIG. 1 is a schematic configuration diagram of an intake and exhaust device of a multi-cylinder engine according to an embodiment of the invention.
Figure 2:
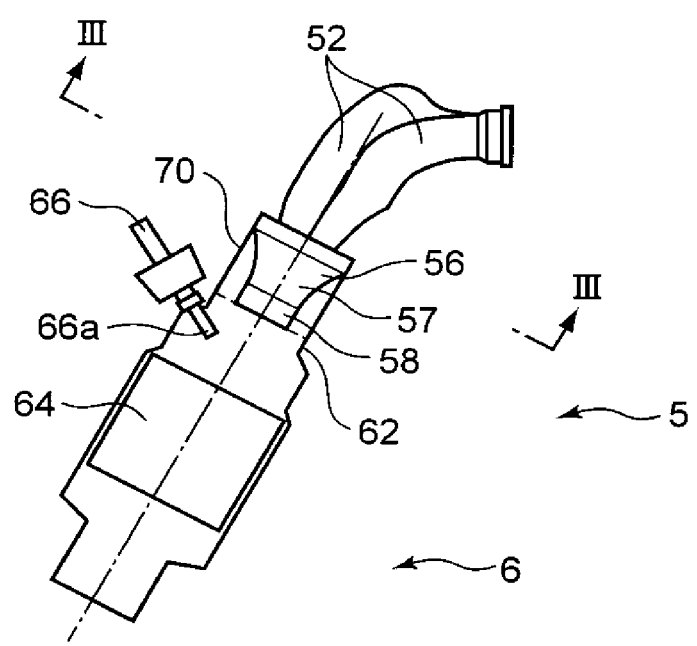
FIG. 2 is a schematic cross-sectional view showing a part of the device in FIG. 1.
Figure 3:
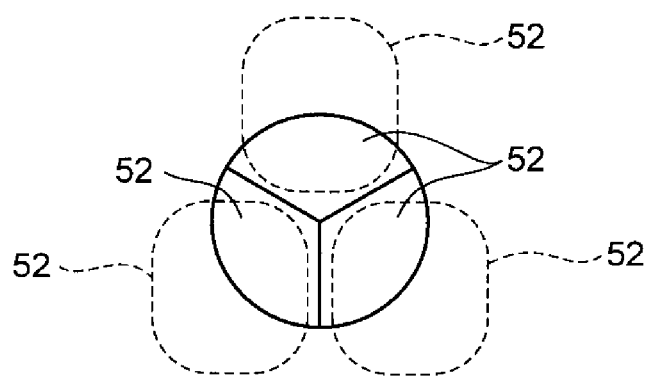
FIG. 3 is a cross-sectional view taken along a line in FIG. 2.

FIG. 1 is a schematic configuration diagram of an intake and exhaust device 100 of a multi-cylinder engine. FIG. 2 is a schematic cross-sectional view showing an exhaust part of the intake and exhaust device 100 of the multi-cylinder engine. FIG. 3 is a cross-sectional view taken along a line in FIG. 2.

The intake and exhaust device 100 of the multi-cylinder engine includes an engine body 1 having a cylinder head 9 and a cylinder block, an ECU 2 for controlling an engine, a plurality of intake tubes 3 connected with the engine body 1, an exhaust manifold 5 connected with the engine body 1, and a catalyst device 6 connected with the exhaust manifold 5.

(1) Structure of Engine Body 1 and Intake Tubes 3

The configuration of the engine body 1 and the intake tubes 3 are described below.

The cylinder head 9 and the cylinder block are formed therein with a plurality of cylinders 12 respectively fitted with pistons. In this embodiment, the engine body 1 is an inline-four engine, and the cylinders 12 include four cylinders aligned in line and formed in the cylinder head 9 and the cylinder block. Specifically, a first cylinder 12a, a second cylinder 12b, a third cylinder 12c, and a fourth cylinder 12d are formed in this order from the ECU side of FIG. 1. Ignition plugs 15 are attached in the cylinder head 9 so as to be exposed in combustion chambers partitioned above the pistons, respectively.

Figure 4:
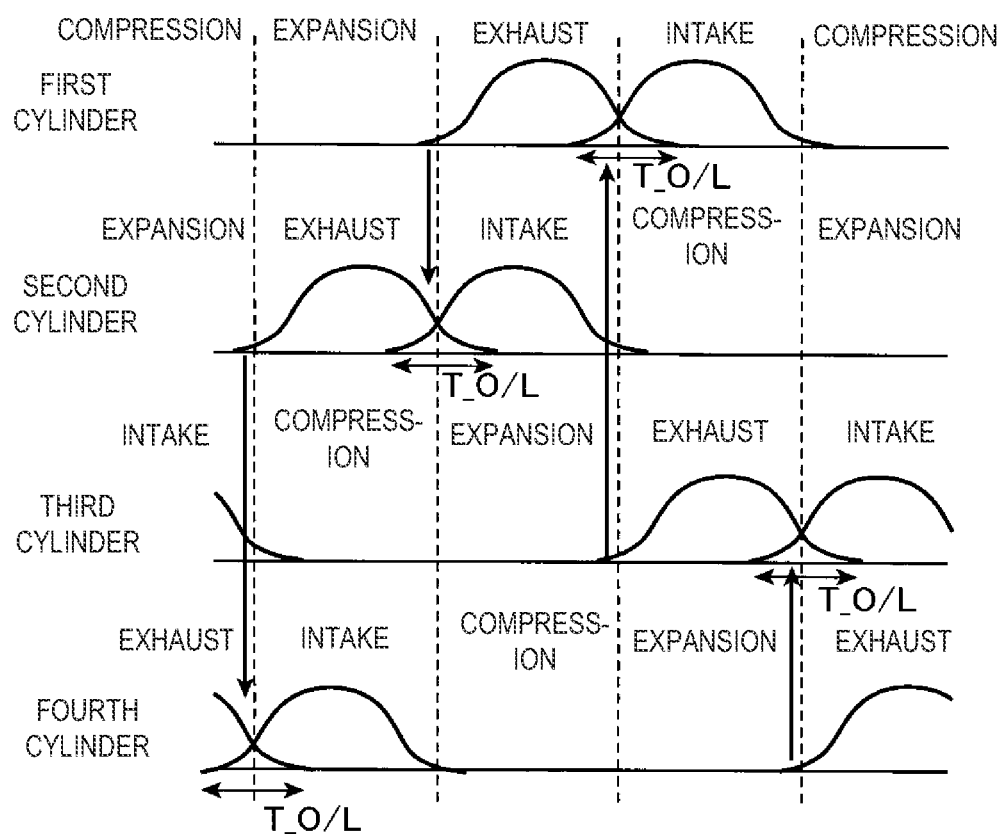
FIG. 4 is a chart for explaining operating timings of an intake valve and an exhaust valve.

The engine body 1 is a four-cycle engine. As shown in FIG. 4, ignitions by the ignition plugs 15 are performed in the cylinders 12a to 12d at timings varied by 180° CA from each other, respectively, so that intake stroke, compression stroke, expansion stroke, and exhaust stroke are performed to vary from the adjacent strokes by 180° CA. In this embodiment, the ignition is performed in the order starting from the first cylinder 12a, the third cylinder 12c, the fourth cylinder 12d, then to the second cylinder 12b, and the exhaust order, which is the order in which the exhaust valves are opened to release the exhaust from the cylinders, is also the same.

Each cylinder 12 is provided thereabove with two intake ports 17 and two exhaust ports 18 opening toward the combustion chamber. Each intake port 17 introduces intake air inside the corresponding cylinder 12. Each exhaust port 18 discharges exhaust gas from inside the corresponding cylinder 12. The intake port 17 is provided with an intake valve 19 for opening and closing the intake port 17 to alternately communicate and seal off the intake port 17 with the cylinder 12. The exhaust port 18 is provided with an exhaust valve 20 for opening and closing the exhaust port 18 to alternately communicate and seal off the exhaust port 18 with the cylinder 12. The intake valves 19 are driven by an intake valve drive mechanism 30 (valve driver) and, thus, open and close the intake ports 17 at a predetermined timing. The exhaust valve 20 is driven by an exhaust valve drive mechanism 40 (valve driver) and, thus, opens and closes the exhaust port 18 at a predetermined timing.

The intake valve drive mechanism 30 includes an intake camshaft 31 coupled to the intake valves 19, and an intake VVT 32. The intake camshaft 31 is coupled to a crankshaft via a power transmitting mechanism, such as a well-known chain-sprocket mechanism, and rotates corresponding to a rotation of the crankshaft to open and close the intake valves 19.

The intake VVT 32 changes operating timings of the intake valves 19. The intake VVT 32 changes a phase difference between the intake camshaft 31 and a predetermined driven shaft that is arranged coaxially with the intake camshaft 31 and directly driven by the crankshaft, so as to change a phase difference between the crankshaft and the intake camshaft 31, and the intake VVT 32 thus changes the operating timings of the intake valves 19. The specific configuration of the intake VVT 32 includes: a hydraulic pressure mechanism for changing the phase difference between the driven shaft and the intake camshaft 31 by generating a pressure difference between a plurality of fluid chambers aligned between the driven shaft and the intake camshaft 31 in a circumferential direction thereof; and an electromagnetic mechanism having an electromagnet provided between the driven shaft and the intake camshaft 31, and for changing the phase difference by applying an electric power to the electromagnet. The intake VVT 32 changes the phase difference based on a target operating timing of the intake valve 19 calculated by the ECU 2.

The exhaust valve drive mechanism 40 has a similar structure to the intake valve drive mechanism 30. In other words, the exhaust valve drive mechanism 40 includes an exhaust camshaft 41 coupled to the exhaust valve 20 and the crankshaft, and an exhaust VVT 42 for changing a phase difference between the exhaust camshaft 41 and the crankshaft to change operating timings of the exhaust valves 20. The exhaust VVT 42 changes the phase difference based on a target operating timing of the exhaust valve 20 calculated by the ECU 2. Further, the exhaust camshaft 41 rotates corresponding to the rotation of the crankshaft to open and close the exhaust valve 20 at the target operating timing.

Note that in this embodiment, the intake and exhaust VVTs 32 and 42 change the opening and closing timings of the intake and exhaust valves 19 and 20, respectively, while keeping constant the opening periods and lifts (i.e., valve profile) of the intake and exhaust valves 19 and 20.

The two intake ports 17 of each cylinder 12 are connected with one intake tube 3 on their upstream side. Specifically, four intake tubes 3 are provided to correspond to the number of the cylinders.

(2) Structure of Exhaust Manifold 5

The exhaust manifold 5 includes three independent exhaust passages 52, a manifold tube 56 (manifold section), and an external cylinder 70 which are arranged in this order from an upstream direction. The manifold tube 56 is constituted with a reduced diameter part 57 and a straight part 58 (straight tube part) arranged coaxially with each other. The reduced diameter part 57 extends downstream from an upstream end of the manifold tube 56. The straight part 58 extends from a downstream end of the reduced diameter part 57 to the downstream end of the manifold tube 56. As used herein, downstream and upstream refer to positions relative to the direction of exhaust gas flow from the cylinders.

Each independent exhaust passage 52 is connected with the exhaust ports 18 of each cylinder 12. Specifically, the exhaust ports 18 of the first cylinder 12a are connected with the exhaust passage 52a, and the exhaust ports 18 of the fourth cylinder 12d are connected with the independent exhaust passage 52d. On the other hand, the operation of the exhaust stroke is not subsequent and the exhaust order is not adjacent between the second and third cylinders 12b and 12c, and the exhaust ports 18 thereof are connected with a single independent passage 52b in view of simplifying the structure, because the exhaust gas is never discharged from the cylinders simultaneously. Further specifically, the upstream part of the independent exhaust passage 52b is formed into two branches where the exhaust ports 18 of the second cylinder 12b are connected with one of them, and the exhaust ports 18 of the third cylinder 12c are connected with the other branch. In this embodiment, the independent exhaust passage 52 corresponding to the second and third cylinders 12b and 12c extends substantially straight with respect to a central part between the cylinders 12b and 12c (i.e., substantially the center of the engine body 1), and the independent exhaust passages 52 corresponding to the other cylinders 12a and 12d extend to curve toward the independent exhaust passage 52 corresponding to the second and third cylinders 12b and 12c.

The independent exhaust passages 52 are independent from each other, and the exhaust gas discharged from the second cylinder 12b or the third cylinder 12c, the exhaust gas discharged from the first cylinder 12a, and the exhaust gas discharged from the fourth cylinder 12d independently flow through the corresponding independent exhaust passages 52, respectively. The exhaust gas passed through the independent exhaust passages 52 flows into the manifold tube 56.

The independent exhaust passages 52 and the manifold tube 56 are formed so that, due to the high speed exhaust gas flowing from the independent exhaust passage 52 to the manifold tube 56, a negative pressure is generated in the adjacent independent exhaust passage(s) 52 and further in the exhaust ports 18 communicating with the adjacent independent exhaust passage(s) 52, by a negative pressure function (ejector effect) caused around the high speed exhaust gas.

Specifically, a flow area of each downstream end part of the independent exhaust passages 52 is set to be smaller toward the downstream direction so that the flow of the exhaust gas increases its speed downstream. In this embodiment, as shown in FIG. 3, a cross-sectional area of each independent exhaust passage 52 is reduced toward the downstream direction from its upstream part having a substantial elliptic cross-section, and the downstream end of each independent exhaust passage 52 has a fan shape of which an area is substantially ⅓ of an elliptic cross-sectional area of the upstream part. Further, the downstream ends of the independent exhaust passages 52 forming the fan shapes assemble to form a substantial circle cross-section as a whole by aligning adjacent to each other, and are connected with the manifold tube 56.

A flow area of an upstream part of the manifold tube 56 is set to be smaller toward its downstream end so that the flow speed of the exhaust gas discharged from any of independent exhaust passages 52 does not decrease at its downstream end (i.e., near an upstream end of the manifold tube 56) and passes through the manifold tube 56 at high speed. In other words, the flow area of the reduced diameter part 57 of the manifold tube 56 is set to be smaller toward the downstream direction.

In this embodiment, the reduced diameter part 57 has a shape to extend with a fixed flow area at its upstream end part and with a gradually smaller flow area toward downstream. Further, in this embodiment, the upstream end part of the reduced diameter part 57 has a cylindrical shape, and a downstream part of the reduced diameter part 57 has a conical trapezoid shape extending coaxially with the cylindrical upstream end part.

The exhaust gas passed through the independent exhaust passage 52 and the reduced diameter part 57 of the manifold tube 56 at high speed flows into the straight part 58 extending from the downstream end of the reduced diameter part 57.

The flow area of the straight part 58 is entirely fixed in the upstream-downstream direction. The flow area of the straight part 58 is the same as the flow area of the downstream end of the reduced diameter part 57, and the straight part 58 has a cylindrical shape extending downstream coaxially with the reduced diameter part 57 from the downstream end of the reduced diameter part 57. In this embodiment, the straight part 58 and the reduced diameter part 57 are formed integrally.

The external cylinder 70 is a tubular member. The external cylinder 70 accommodates the manifold tube 56 therein. The external cylinder 70 is connected with the upstream end of the manifold tube 56 and extends from the upstream end to the downstream end of the manifold tube 56. Thus, the part of the exhaust manifold 5 where the manifold tube 56 is arranged has a double tube structure including the manifold tube 56 and the external cylinder 70. With the double tube structure, the part of the exhaust manifold 5 where the manifold tube 56 is arranged is maintained to have a high rigidity.

The external cylinder 70 extends coaxially with the manifold tube 56 while the inner circumferential surface of the external cylinder 70 contacts with an outer circumferential surface of the cylindrical upstream end part of the manifold tube 56. The external cylinder 70 extends with a fixed cross-sectional area, and the inner circumferential surface of the external cylinder 70 is spaced outwardly from the outer circumferential surface of the manifold tube 56 in the downstream part of the manifold tube 56. In this embodiment, the external cylinder 70 is a circular tube.

(3) Structure of Catalyst Device 6

The catalyst device 6 purifies the exhaust gas discharged from the engine body 1. The catalyst device 6 includes a catalyst 64, such as a three-way catalyst for purifying the exhaust gas, and a catalyst case 62 for accommodating the catalyst 64. The catalyst 64 is accommodated coaxially in the catalyst case 62. In this embodiment, the catalyst case 62 has a substantial cylindrical shape extending in the upstream-downstream direction. The catalyst 64 has a substantial cylindrical shape.

The catalyst case 62 and the external cylinder 70 are formed integrally, and the catalyst case 62 extends continuously downstream from the downstream end of the external cylinder 70. Specifically, the catalyst case 62 extends a predetermined length from the downstream end of the external cylinder 70 with the same cross-sectional area as the downstream end, further extends a predetermined length with a larger cross-sectional area than the downstream end of the external cylinder 70, and extends to its downstream end with substantially the same cross-sectional area as the cross-sectional area of the upstream end of the catalyst case 62.

As described above, the inner circumferential surface of the external cylinder 70 is spaced outwardly from the outer circumferential surface of the manifold tube 56 at the downstream end part of the manifold tube 56. Therefore, the inner circumferential surface of the upstream end part of the catalyst case 62 also extends downstream at a position radially outward from the manifold tube 56.

The catalyst 64 exists at substantially the center of the catalyst 62 and is accommodated in a part thereof where the cross-sectional area is set larger. Therefore, a predetermined space is formed in the upstream end part of the catalyst case 62. The exhaust gas discharged from the manifold tube 56 flows into the space in the upstream end part of the catalyst case 62, and further into the catalyst 64.

The catalyst case 62 is attached to an $O_2$ sensor 66 (oxygen concentration detector) for detecting an oxygen concentration in the exhaust gas. The $O_2$ sensor 66 includes in its tip, a contact part 66a for contacting with the exhaust gas, and the oxygen concentration is detected through the contact between the contact part 66a and the exhaust gas. The $O_2$ sensor 66 is fixed in a state where the contact part 66a is in the space formed in the upstream end part of the catalyst case 62. In other words, the contact part 66a is arranged inside the catalyst case 62 downstream than the manifold tube 56 and upstream than the catalyst 64. In this embodiment, the contact part 66a is arranged near a position corresponding to the inner circumferential surface of the downstream end of the manifold tube 56 in the upstream-downstream direction.

(4) Control Contents

Next, contents of a control performed by the ECU 2 is described.

The ECU 2 can control the operating timings of the intake and exhaust valves 19 and 20. The ECU 2 calculates a current operation condition based on signals from various sensors, and controls the operating timings of the intake and exhaust valves 19 and 20 to the target operating timings according to the operation condition.

Within the entire operating ranges, the target operating timings of the intake and exhaust valves 19 and 20 of the same cylinder are set so that the opening periods of the intake and exhaust valves 19 and 20 overlap with each other at an intake top dead center (TDC) and the exhaust valves 20 start to open during an overlap period T_O/L of a different cylinder 12. Specifically, as shown in FIG. 4, the exhaust valves 20 of the third cylinder 12c open while the intake valves 19 of the first cylinder 12a overlap with the exhaust valves 20 thereof, the exhaust valves 20 of the fourth cylinder 12d open while the intake valves 19 of the third cylinder 12c overlap with the exhaust valves 20 thereof, the exhaust valves 20 of the second cylinder 12b open while the intake valves 19 of the fourth cylinder 12d overlap with the exhaust valves 20 thereof, and the exhaust valves 20 of the first cylinder 12a open while the intake valves 19 of the second cylinder 12b overlap with the exhaust valves 20 thereof.

Figure 5:
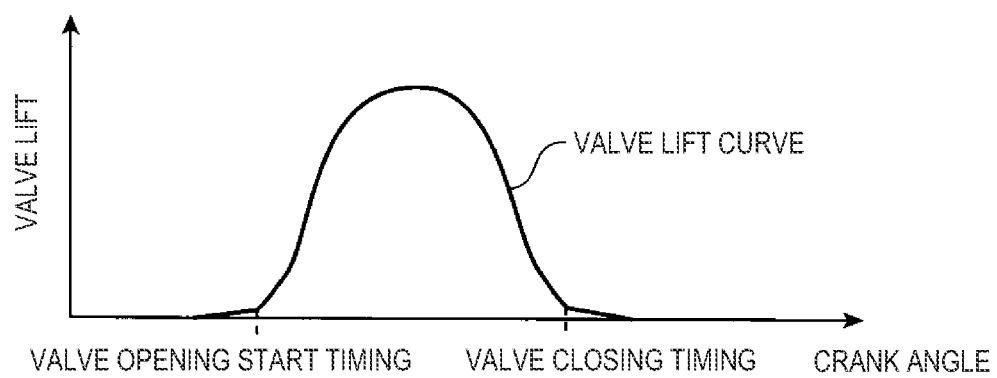
FIG. 5 is a chart for explaining opening and closing timings of the intake and exhaust valves according to the embodiment of the invention.

Note that, in the device, each of the opening and closing timings of the intake and exhaust valves 19 and 20 indicate, in a lift curve of each valve, a timing at which the lift of the valve rises or falls steeply as shown in FIG. 5 (e.g., a timing with a lift of 0.4 mm).

(5) Operation and Effect

As above, with the device 100, when the exhaust valves 20 of the predetermined cylinder 12 (hereinafter, may suitably be referred to as "the exhaust stroke cylinder 12") open, the exhaust gas is discharged from the cylinder 12 to the corresponding exhaust ports 18 and the corresponding independent exhaust passage 52 at high speed. Particularly, the exhaust gas is discharged from the cylinder 12 at extremely high speed (i.e., blowdown gas) right after the exhaust valve 20 starts to open.

As described above, the independent exhaust passage 52 and the manifold tube 56 are configured so that the exhaust gas is discharged at high speed from the predetermined independent exhaust passage 52 to the manifold tube 56 and, due to the ejector effect caused thereby, the negative pressure is generated in the other independent exhaust passage(s) 52 and further in the exhaust ports 18 communicating with the other independent exhaust passage(s) 52. Further, during the overlap period of the predetermined cylinder 12 (intake stroke cylinder), the exhaust valves 20 of the other cylinder 12 (exhaust stroke cylinder) of which the exhaust order is next to the predetermined cylinder 12 open.

Therefore, due to that the exhaust valves 20 of the exhaust stroke cylinder 12 open and the blowdown gas is discharged from the exhaust stroke cylinder 12 to the manifold tube 56 via the independent exhaust passage 52, the negative pressure is generated in the exhaust ports 18 of the intake stroke cylinder 12 in the overlap period. As a result, gas remaining inside the intake stroke cylinder 12 in the overlap period is sucked out therefrom downstream, and thereby, scavenging of the intake stroke cylinder 12 is facilitated. Thus, a fresh air amount to the intake stroke cylinder 12 increases and a high engine output can be achieved. Particularly, in this embodiment, the independent exhaust passages 52 are adjacently connected to the manifold tube 56. Therefore, the negative pressure generated around the exhaust gas discharged from the predetermined independent exhaust passage 52 affects on the other independent exhaust passage(s) 52 effectively, and a high scavenging facilitating effect (i.e., high engine output increasing effect) can be exerted.

Here, as the configuration of flowing the exhaust gas discharged from the independent exhaust passage 52 into the manifold tube 56 to further downstream while maintaining the high speed so as to generate the high negative pressure inside the predetermined exhaust ports 18 by effectively exerting the ejector effect, as described above, the flow area of the upstream part of the manifold tube 56 may be set to be smaller toward the downstream direction. Therefore, for example, it may be considered to use only the reduced diameter part 57 as the manifold tube 56 by omitting the straight part 58. Alternatively, as in a comparative embodiment shown in FIG. 6, it may be considered to provide a diffuser part 59 to the manifold tube 56 in addition to the reduced diameter part 57 and the straight part 58. The diffuser part 59 extends downstream from the downstream end of the straight part 58 coaxially with the straight part 58, and has a shape in which a flow area enlarges gradually to the downstream direction. In the comparative embodiment shown in FIG. 6, the external cylinder 70 is omitted.

However, as a result of the extensive study by the inventors, they have found that using only the reduced diameter part 57 of which the flow area gradually become smaller toward downstream or the configuration of the comparative embodiment leads to a higher variation in the amount of negative pressure generated in the exhaust ports 18, caused by a manufacturing variation of the manifold tube 56, and further leads to a higher variation in the engine output.

Figure 6:
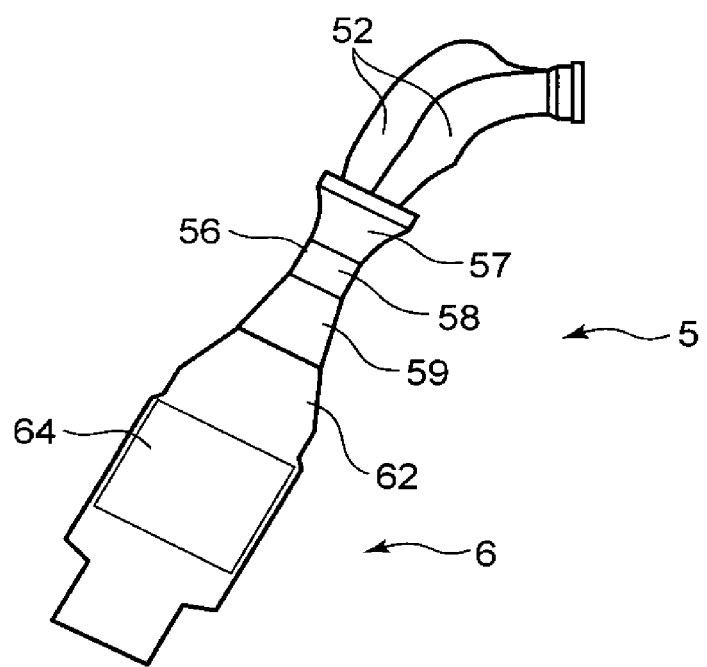
FIG. 6 is a cross-sectional view of an exhaust system according to a comparative embodiment to the embodiment of the invention.
Figure 7:
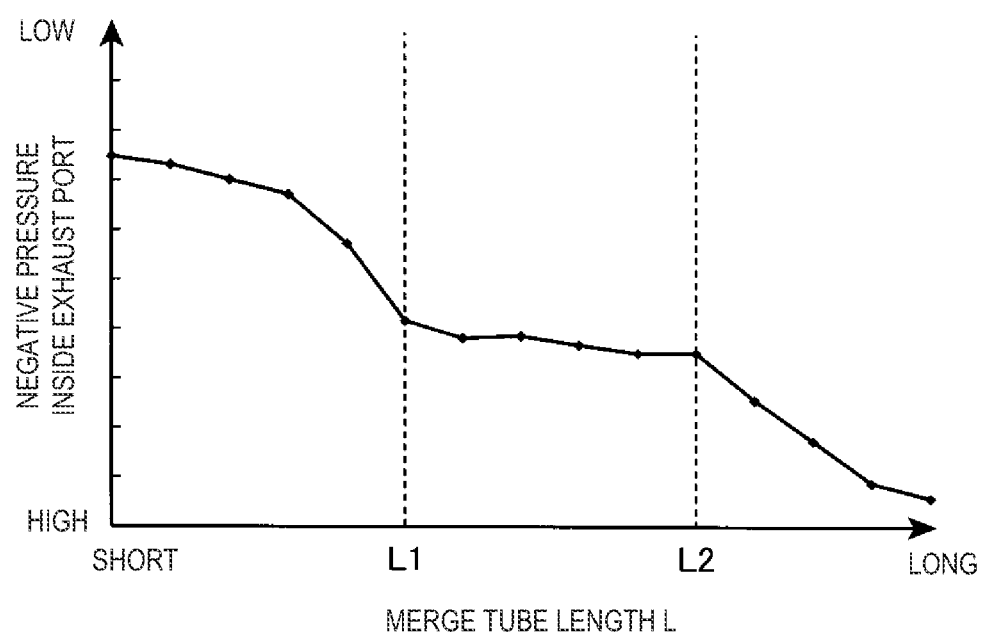
FIG. 7 is a chart showing a relation between a length L of a manifold tube and a negative pressure.

FIG. 7 shows a result of researching the configuration of the manifold tube 56 and the negative pressure generated in the exhaust ports 18. FIG. 7 shows a change in negative pressure inside the exhaust ports 18 when the manifold tube 56 with the configuration of the comparative embodiment shown in FIG. 6 is cut from its downstream end and the position of the downstream end of the manifold tube 56 and the position of the catalyst device 6 connected to the downstream end are changed. In FIG. 7, the lateral axis indicates a length L of the manifold tube 56 (see FIGS. 8A to 8C), and the vertical axis indicates the negative pressure inside the exhaust ports 18.

Figure 8A:
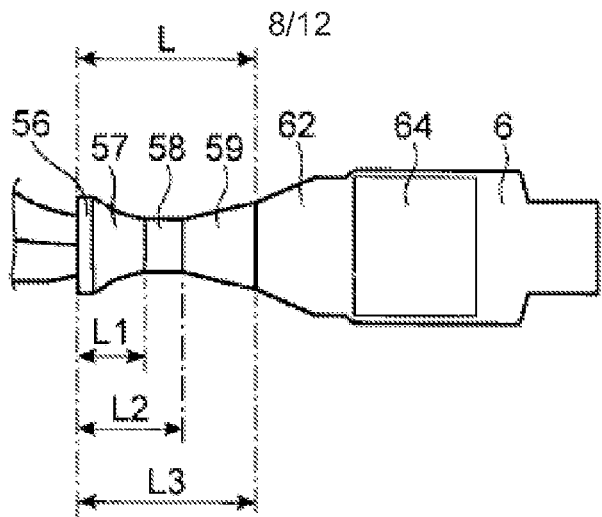
FIG. 8A is a view showing a configuration corresponding to the chart in FIG. 7 when the length L of the manifold tube is between L2 and L3.

As shown in FIG. 8A, a third reference length L3 is the length of the manifold tube 56 in the comparative embodiment. A second reference length L2 is a length from the upstream end of the manifold tube 56 in the comparative embodiment to the upstream end of the diffuser part 59 (i.e., the downstream end of the straight part 58). A first reference length L1 is a length from the upstream end of the manifold tube 56 in the comparative embodiment to the upstream end of the straight part 58 (i.e., the downstream end of the reduced diameter part 57).

Therefore, in the condition where the manifold tube length L is between L2 and L3, as shown in FIG. 8A, the manifold tube 56 is constituted with the reduced diameter part 57, the straight part 58, and the diffuser part 59 of which the flow area gradually enlarges toward the downstream direction, which are arranged sequentially from the upstream direction, and the flow area of the manifold tube 56 near its downstream end gradually enlarges toward the downstream direction. Note that, in this condition, the difference of the manifold tube length L is the difference of the length of the diffuser part 59.

Figure 8B:
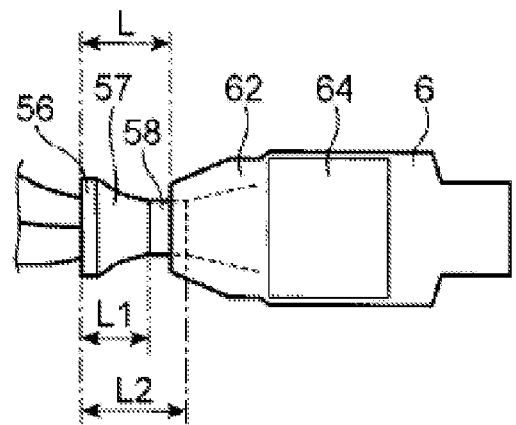
FIG. 8B is a view showing a configuration corresponding to the chart in FIG. 7 when the length L of the manifold tube is between L1 and L2.

Further, in the condition where the manifold tube length L is between L1 and L2 in FIG. 7, as shown in FIG. 8B, the manifold tube 56 is constituted with the reduced diameter part 57 and the straight part 58 of which the flow area is fixed in the upstream-downstream direction, which are arranged sequentially from the upstream direction, and the flow area of the manifold tube 56 near its downstream end is fixed in the upstream-downstream direction. Note that, in this condition, the difference of the manifold tube length L is the difference of the length of the straight part 58.

Figure 8C:
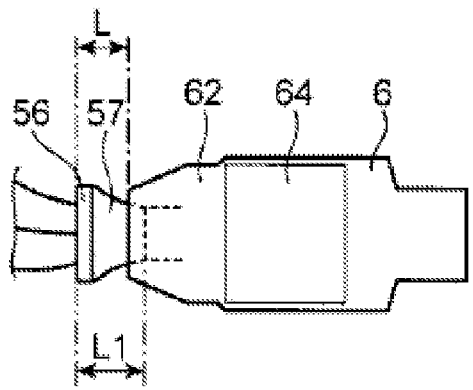
FIG. 8C is a view showing a configuration corresponding to the chart in FIG. 7 when the length L of the manifold tube is below L1.

Further, in the condition where the manifold tube length L is below L1 in FIG. 7, as shown in FIG. 8C, the manifold tube 56 is constituted with only the reduced diameter part 57 of which the flow area becomes smaller gradually toward downstream, and the flow area of the manifold tube 56 near its downstream end gradually becomes smaller toward the downstream direction. Note that, in this condition, the difference of the manifold tube length L is the difference of the length of the reduced diameter part 57.

As shown in FIG. 7, with the configuration in which the manifold tube length L is between L2 and L3 and the flow area of the manifold tube 56 near its downstream end gradually enlarges toward the downstream direction, or with the configuration in which the manifold tube length L is below L1 and the flow area of the manifold tube 56 near its downstream end gradually becomes smaller toward the downstream direction, a change range of the negative pressure inside the exhaust ports 18 with respect to the change of the manifold tube length L is wide. It may be considered that this is because, with the configuration in which the flow area of the manifold tube 56 near its downstream end changes, the speed of the exhaust gas is different depending on the position near the downstream end in the upstream-downstream direction and, thus, the speed of the exhaust gas passing through the downstream end of the manifold tube 56 (i.e., the manifold tube 56) changes due to the change of the manifold tube length L. Therefore, when the manifold tube 56 is constituted with only the reduced diameter part 57 of which the flow area gradually becomes smaller toward downstream, or the flow area near the downstream end of the manifold tube 56 enlarges gradually toward the downstream direction as in the comparative embodiment, the variation in negative pressure inside the exhaust ports 18 becomes higher with respect to the variation of the manifold tube length L due the manufacturing variation.

On the other hand, with the configuration in which the manifold tube length L is between L1 and L2 and the flow area of the manifold tube 56 near its downstream end is fixed, the negative pressure inside the exhaust ports 18 hardly changes even if the manifold tube length L changes.

Therefore, with the device 100 where the manifold tube 56 is constituted with the reduced diameter part 57 and the straight part 58 of which the flow area is fixed in the upstream-downstream direction, the variation in negative pressure inside the exhaust ports 18 can be suppressed with respect to the variation of the manifold tube length L due the manufacturing variation. Here, the manufacturing variation includes variations caused in manufacturing the manifold tube 56 and/or due to changing the manifold tube length by cutting the downstream end of the manifold tube 56 to correspond to the sizes of the independent exhaust passage 52 and the catalyst device 6 when the manifold tube 56 is attached thereto.

Figures 9A, 9B:
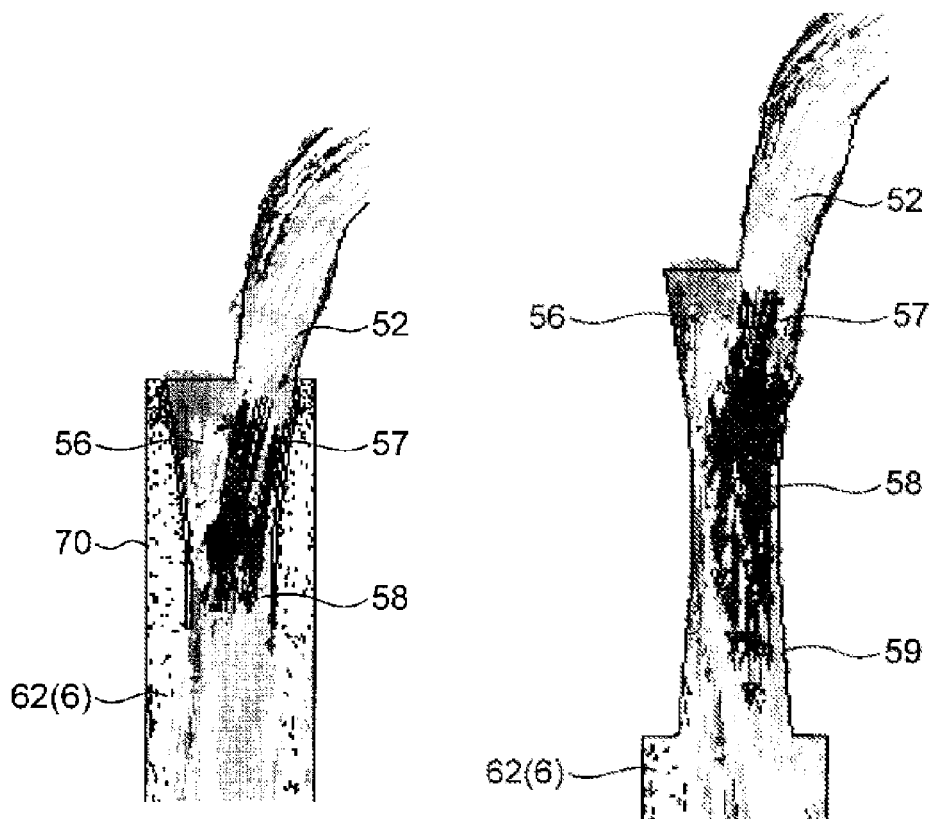
FIG. 9A is a view showing a speed distribution of exhaust gas near the manifold tube according to the embodiment shown in FIG. 1.
FIG. 9B is a view showing a speed distribution of exhaust gas near a manifold tube according to the comparative embodiment shown in FIG. 6.

Further, results of researching the flow of the exhaust gas in the comparative embodiment shown in FIG. 6 and the device are shown in FIGS. 9A and 9B. FIG. 9A is the result from the device 100, and FIG. 9B is the result from the comparative embodiment. In FIGS. 9A and 9B, the flow rate is indicated by the darkness of the color and the length of the arrows, and the thus flow rate is generally higher in the portions of these figures that are darker in color.

As shown in FIG. 9B, in the comparative embodiment in which the downstream end of the manifold tube 56 serves as the diffuser part 59, the distribution of the exhaust gas comes close to be even on one side of the downstream end of the reduced diameter part 57 in a cross-sectional direction. However, in this comparative embodiment, with the diffuser part 59, the speed of the exhaust gas does not decelerate in the straight part 58 on the downstream side of the reduced diameter part 57, and the exhaust gas flows further downstream without spreading in the cross-sectional direction. Therefore, the exhaust gas flows to the downstream end of the manifold tube 56 while attached to a surface of the inner circumferential surface of the diffuser 59 on the independent exhaust passage 52 side to which the exhaust gas is discharged, and the distribution of the exhaust gas in the cross-sectional direction of the manifold tube 56 becomes uneven at the downstream end of the manifold tube 56 (i.e., the upstream end of the catalyst device 6).

On the other hand, as shown in FIG. 9A, with the device 100 where the downstream end of the manifold tube 56 serves as the straight part 58, the speed of the exhaust gas decelerates in the straight part 58 and, thus, spreads therein in the cross-sectional direction. Accordingly, the distribution of the exhaust gas in the cross-sectional direction of the manifold tube 56 becomes closer to even at the downstream end of the manifold tube 56 (i.e., the upstream end of the catalyst device 6) compared to the comparative embodiment shown in FIG. 9B.

Thus, with the device 100, the distribution of the exhaust gas becomes even at the upstream end of the catalyst device 6. Therefore, the exhaust gas can be introduced into the catalyst 64 evenly, and the exhaust gas can be purified efficiently in the catalyst 64.

Further, with the device 100, the contact part 66a of the $O_2$ sensor 66 is arranged in the part of the upstream end part of the catalyst device 6 where the exhaust gas flows evenly. Therefore, the oxygen concentration can be detected further accurately by the $O_2$ sensor.

Particularly, with the device 100, the external cylinder 70 and the upstream end part of the catalyst case 62 continuous to the external cylinder 70 extend at the position spaced outwardly from the manifold tube 56. Therefore, compared to the case where the catalyst case 62 extends downstream continuously from the downstream end of the manifold tube 56, the exhaust gas discharged to the upstream end of the catalyst device 6 from the manifold tube 56 is suppressed from attaching on the inner circumferential surface of the catalyst case 62, and the distribution of the exhaust gas becomes closer to even at the upstream end of the catalyst case 62.

(6) Other Embodiments

Figure 10:
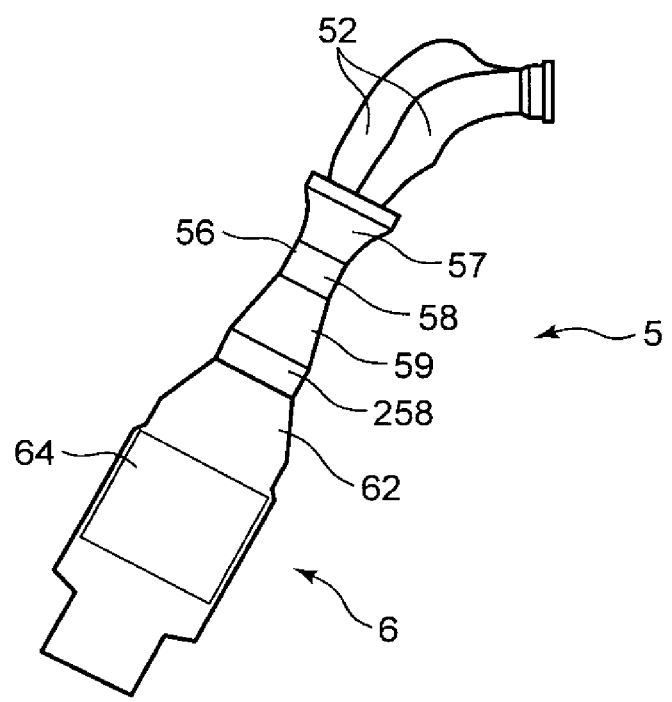
FIG. 10 is a schematic configuration diagram showing a part of an intake and exhaust device of a multi-cylinder engine according to another embodiment of the invention.

Here, as shown in FIG. 7, when the diffuser part 59 is provided downstream of the straight part 58, the negative pressure inside the exhaust ports 18 can be increased. Thus, to suppress a performance variation due to the manufacturing variation while increasing the negative pressure, as shown in FIG. 10, a downstream straight part 258 extending with a fixed flow area may be provided downstream of the diffuser part 59.

Figure 11:
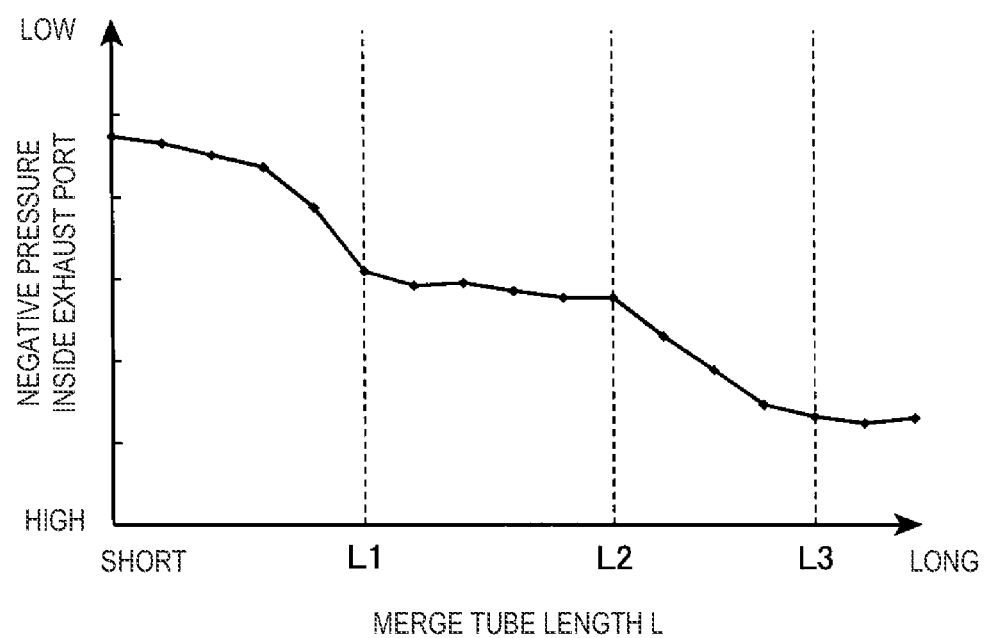
FIG. 11 is a chart showing a relation between a length of a manifold tube and a negative pressure in the device shown in FIG. 10.

FIG. 11 shows a chart that is FIG. 7 added with a result of researching a relation between the manifold tube length L provided with the downstream straight part 258 on downstream of the diffuser part 59 of the comparative embodiment, and the negative pressure. In FIG. 11, the result with above L3 of the manifold tube length L corresponds to the result when the downstream straight part 258 is provided downstream of the diffuser part 59. As shown in FIG. 11, also when the downstream straight part 258 is provided downstream of the diffuser part 59, the change range of the negative pressure with respect to the change of the manifold tube length L can be suppressed to be small, and the performance variation due to the manufacturing variation can be suppressed. Further, with this configuration, because the exhaust gas flows downstream with less resistance by the diffuser part 59, the speed of the exhaust gas can be maintained further high. Note that, with this configuration, the straight part 58 between the reduced diameter part 57 and the diffuser part 59 may be omitted.

Note that, if the diffuser part 59 and the downstream straight part 258 are added, the length of the manifold tube 56 correspondingly becomes long. Therefore, in view of lightening in weight and downsizing of the device, and shortening the passage length from the cylinder 12 to catalyst 64 to facilitate early activation and maintain the activation of the catalyst, the diffuser part 59 and the downstream straight part 258 are preferably omitted.

Figure 12:
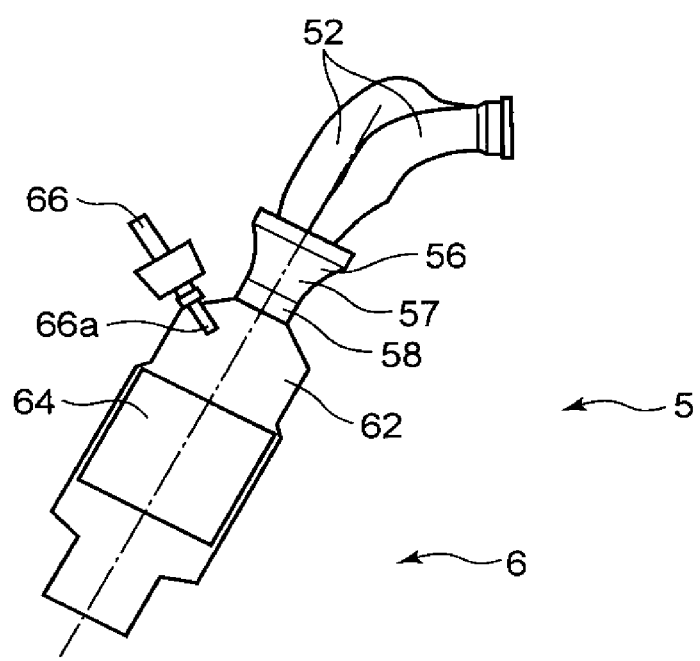
FIG. 12 is a schematic configuration diagram showing a part of an intake and exhaust device of a multi-cylinder engine according to still another embodiment of the invention.

Alternatively, as shown in FIG. 12, the catalyst case 62 may be connected to the downstream end of the manifold tube 56 directly by omitting the external cylinder 70. However, if the manifold tube 56 is surrounded by the external cylinder 70 and the part arranged with the manifold tube 56 has the double tube structure, the rigidity of this part can be improved. Further, the temperature decrease of the exhaust gas can be suppressed.

Here, with the configuration in which the catalyst case 62 is connected to the downstream end of the manifold tube 56 directly, the inner circumferential surface of the upstream end of the catalyst case 62 is preferably positioned outward of the downstream end of the manifold tube 56 so that the exhaust gas discharged from the manifold tube 56 to the upstream end of the catalyst device 6 is suppressed from attaching on the inner circumferential surface of the catalyst case 62 and the distribution of the exhaust gas becomes closer to even at the upstream end of the catalyst device 6. For example, as shown in FIG. 12, when the upstream end part of the catalyst case 62 tapers, the tapering angle is preferable to be above approximately 20°.

Further, in the above embodiment, within the entire engine operating range, the control of overlapping the opening period of the intake valves 19 with the opening period of the exhaust valves 20 and overlapping the opening start timing of the exhaust valves 20 of the other cylinder 12 with the overlap period of the intake and exhaust valves 19 and 20 is described; however, the control may be performed only in a partial range, such as a low-speed and high-load engine operating range where the engine speed is below a predetermined speed and the engine load is above a predetermined load. In other words, within the engine operating range where the engine speed is high, because an exhaust gas flow rate increases, the scavenging facilitating effect obtained by a pumping loss reduction may be higher than the scavenging facilitating effect obtained from the ejector effect. Therefore, in such a case, it is preferred to control the intake and exhaust valves 19 and 20 to improve the scavenging facilitating effect.

Further, to reduce the pumping loss within the operating range where the engine speed is high as described above, a passage for bypassing between each section of the independent exhaust passage 52 where the flow area becomes smaller and the downstream part of the manifold tube 56 may be provided, formed to have a small exhaust resistance by, for example, setting a fixed flow area, and attached with a valve for opening and closing the passage so that by closing the valve in the engine operating range where the engine speed is low, the exhaust gas passes only through each independent exhaust passage 52, and by opening the valve in the operating range where the engine speed is high, the exhaust gas also passes through the bypass passage.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE CHARACTERS

1 Engine Body
6 Catalyst Device
19 Intake Valve
20 Exhaust Valve
30 Intake Valve Drive Mechanism (Valve Driver)
40 Exhaust Valve Drive Mechanism (Valve Driver)
52 Independent Exhaust Passage
56 Manifold Tube (Manifold Section)
57 Reduced Diameter Part
58 Straight Part (Straight Tube Part)
62 Catalyst Case
64 Catalyst
70 External Cylinder

The invention claimed is:

1. An intake and exhaust device of a multi-cylinder engine having a plurality of cylinders, each cylinder respectively formed with an intake port and an exhaust port and respectively provided with an intake valve for opening and closing the intake port and an exhaust valve for opening and closing the exhaust port, the device comprising:
   independent exhaust passages, each independent exhaust passage connected with either one of a single cylinder or two or more cylinders not adjacent to each other in an exhaust order;
   a manifold section connected with each downstream end of the independent exhaust passages to merge exhaust gas passed through the independent exhaust passages therein;
   a catalyst device connected with a downstream end of the manifold section and including a catalyst for purifying the exhaust gas passed through the manifold section, and a catalyst case for accommodating the catalyst; and
   a controller coupled to a valve driver,
   wherein within a low-speed and high-load engine operating range where at least an engine speed is below a predetermined speed and an engine load is above a predetermined load, the controller calculates opening periods for the intake and exhaust valves of each cylinder, and controls the valve driver to open the intake and exhaust valves of each cylinder during the calculated opening periods such that, for a particular cylinder, an opening period of a first intake valve overlaps with an opening period of a first exhaust valve for a predetermined overlap period, and the overlap period of that particular cylinder overlaps a timing where a second exhaust valve of an associated cylinder adjacent in exhaust order to the particular cylinder opens,
   wherein independent exhaust passages connected with cylinders having an adjacent exhaust order are adjacently connected with the manifold section,
   wherein the downstream end of each independent exhaust passage is shaped to have a flow area smaller toward a downstream direction so that a negative pressure is generated in the exhaust port connected with one or more adjacent independent exhaust passages by an ejector effect due to the exhaust gas being discharged from the exhaust port of each cylinder to the manifold section through the downstream end of the corresponding independent exhaust passage, wherein the manifold section includes a reduced diameter part extending downstream from an upstream end of the manifold section and having a smaller flow area toward a downstream direction, and a straight tube part extending downstream with a substantially fixed flow area from the downstream end of the manifold section, and wherein the catalyst device is directly connected to the downstream end of the straight tube part, so that a wall of the straight tube part does not couple to a diffuser part that has a shape in which a flow area enlarges gradually in the downstream direction.

2. The device of claim 1, wherein the straight tube part extends with substantially a same flow area as a flow area of the downstream end of the reduced diameter part from the downstream end of the reduced diameter part to the downstream end of the manifold section.

3. The device of claim 2, further comprising an external cylinder serving as a cylindrical member integrally formed with the catalyst case and extending from an upstream end of the catalyst case to the upstream end of the manifold section to be connected therewith, the manifold section being accommodated inside the external cylinder.

4. The device of claim 2, further comprising an oxygen concentration detector including a contact part contacting with the exhaust gas discharged from each cylinder and for detecting an oxygen concentration within the exhaust gas, wherein the contact part is arranged inside the catalyst case between downstream of the manifold section and upstream of the catalyst.

5. The device of claim 4, further comprising an external cylinder serving as a cylindrical member integrally formed with the catalyst case and extending from an upstream end of the catalyst case to the upstream end of the manifold section to be connected therewith, the manifold section being accommodated inside the external cylinder.

6. The device of claim 1, further comprising an external cylinder serving as a cylindrical member integrally formed with the catalyst case and extending from an upstream end of the catalyst case to the upstream end of the manifold section to be connected therewith, the manifold section being accommodated inside the external cylinder.

7. The device of claim 4, further comprising
an inner circumferential surface of an external cylinder that is spaced outwardly from an outer circumferential surface of the manifold section.

* * * * *